Patented Oct. 18, 1938

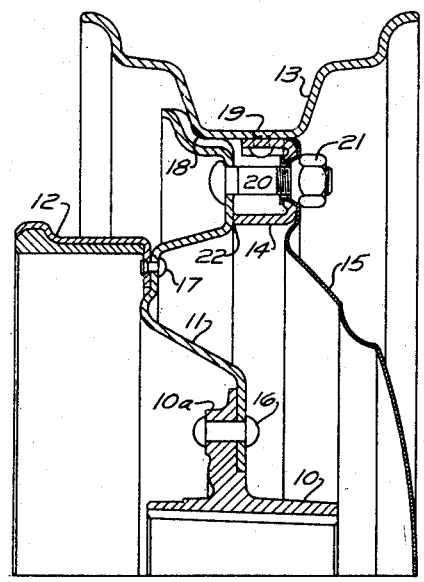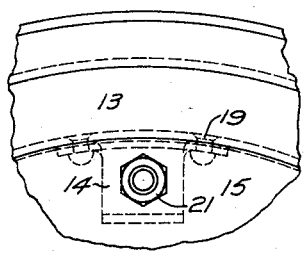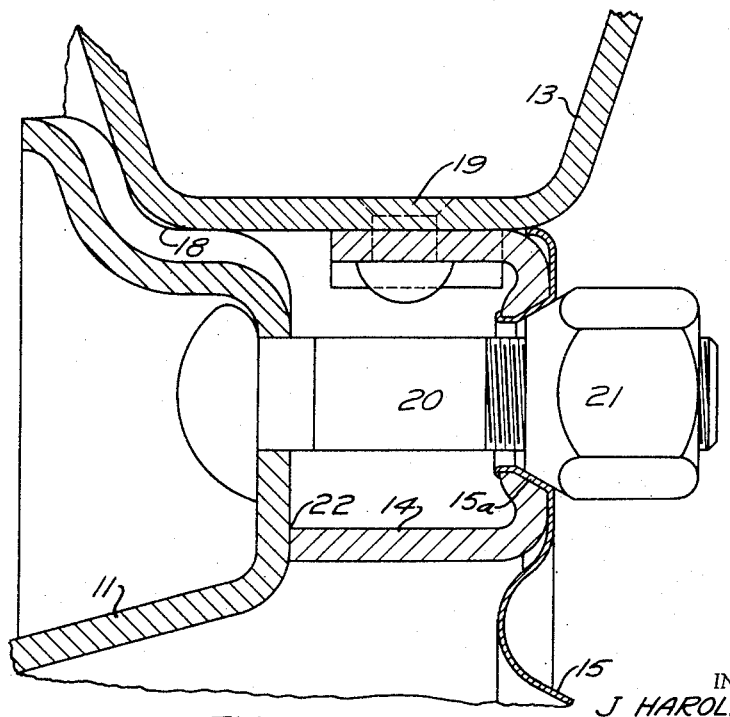

2,133,454

UNITED STATES PATENT OFFICE 2,133,454

VEHICLE WHEEL

J Harold Hunt, Lansing, Mich., assignor to Motor Wheel Corporation, Lansing, Mich., a corporation of Michigan Application July 8, 1935, Serial No. 30,261

1 Claim. (Cl. 301—37)

This invention relates to vehicle wheels of the type employing a demountable rim. It has to do primarily with the provision for such a wheel of a demountable rim with an ornamental cover secured thereto, whereby the rim and cover may be installed upon and removed from the wheel as a unit. It also has to do with the provision of a novel arrangement for attaching the rim to the wheel.

The preferred embodiment of the invention is illustrated in the accompanying drawing wherein:

Figure 1 is a partial sectional view of a vehicle wheel;

Figure 2 is an enlarged fragmentary sectional view of the peripheral portion of the wheel shown in Figure 1;

Figure 3 is a fragmentary front view in elevation of the peripheral portion of the wheel shown in Figure 1.

The wheel illustrated in the drawing includes a conventional hub 10, a wheel body 11, a brake drum 12, a demountable rim 13, attaching lugs 14, and an ornamental cover 15. The hub 10 is of the conventional type including the radially extending flange 10a to which the wheel body 11 is secured as by the rivets 16. The brake drum 12 is attached to the wheel body 11 by rivets 17.

The wheel body 11 is provided with a peripheral rim seat 18 upon which one edge of rim 13 is mounted. It will be observed that the axial extent of rim seat 18 is less than the width of the base of the rim 13.

Preferably four lugs 14 are permanently attached to rim 13 by the rivets 19. These lugs are of the shape best shown in Figures 2 and 3 including an opening in the radial portion thereof. The wheel body 11 is also provided with openings which receive the attaching bolts 20. In mounting the rim upon the wheel the outer threaded extremities of bolts 20 are received within the openings in lugs 14. The lugs are secured upon the bolts 20 by means of the nuts 21 threaded on to the outer extremity of the bolts.

When the rim 13 is mounted upon its seat 18, as shown in Figures 1 and 2, the radially inner portions of lugs 14 contact wheel body 11 in a region remote from its rim seat as indicated at 22. Thus when the nuts 21 are tightened on the bolts 20 one edge of rim 13 is securely fastened upon rim seat 18 and the other edge of rim 13 is supported and held in position by reason of the contact between wheel body 11 and lug 14 at 22. By this arrangement the amount of metal required in forming the rim seat is greatly reduced without weakening the support for rim 13.

The cover 15 is permanently secured to lugs 14 and through lugs 14 to rim 13, the attachment between the cover and the lugs being effected by forming openings in the cover to register with the openings in the lugs, forming a draw-neck 15a around said openings and spinning the inner edge of said draw-necks 15a over the inner surface of lugs 14 adjacent the openings therein. Thus when the bolts 20 are received in the openings formed in lugs 14 they also project through the corresponding openings in cover 15. When nuts 21 are threaded upon bolts 20 they engage the draw-necks 15a of cover 15 and securely attach the lugs, the rim and the cover to the wheel body 11.

From the foregoing description it will be apparent that this invention not only provides a novel means for attaching a demountable rim to a wheel body whereby the rim seat on the wheel body may be of but limited axial extent, but also provides a unique arrangement of demountable rim, attaching lug, and cover, whereby these latter elements may be installed and removed as a unit.

The scope of the invention for which Letters Patent are desired is indicated in the appended claim.

I claim:

A vehicle wheel including, in combination, a rim having an annular surface and a side wall extending substantially radially therefrom, a U-shaped lug having its base located in substantially the plane of said side wall and its legs extending axially inwardly of the rim, one leg of the U-shaped lug being attached to the annular surface of the rim and the other leg being spaced therefrom and extending inwardly a greater distance than the leg attached to the rim, a wheel cover secured to the base of the lug, said wheel cover lying in substantially the plane of the said rim side wall and having its periphery adjacent the annular surface of the rim, a wheel body having a rim seat engaging the rim and an axially outer face in contact with the longer leg of the lug, and means securing the rim, lug and cover to the wheel body.

J HAROLD HUNT.